United States Patent
Yang et al.

(10) Patent No.: US 9,783,054 B2
(45) Date of Patent: Oct. 10, 2017

(54) ACCELERATOR PEDAL INFORMATION FEEDBACK SYSTEM

(71) Applicant: Aleees Eco Ark (Cayman) Co. Ltd., Grand Cayman (KY)

(72) Inventors: Anthony An-Tao Yang, Bade (TW); Gordon Ching Chen, Bade (TW)

(73) Assignee: ALEEES ECO ARK (CAYMAN) CO., LTD., Grand Cayman (KY)

( * ) Notice: Subject to any disclaimer, the term of this patent is extended or adjusted under 35 U.S.C. 154(b) by 21 days.

(21) Appl. No.: 14/906,243

(22) PCT Filed: Jul. 24, 2013

(86) PCT No.: PCT/CN2013/080009
§ 371 (c)(1),
(2) Date: Jan. 19, 2016

(87) PCT Pub. No.: WO2015/010276
PCT Pub. Date: Jan. 29, 2015

(65) Prior Publication Data
US 2016/0167511 A1    Jun. 16, 2016

(51) Int. Cl.
*B60K 26/02* (2006.01)
(52) U.S. Cl.
CPC ...... *B60K 26/021* (2013.01); *B60K 2026/025* (2013.01)
(58) Field of Classification Search
CPC ............ B60K 26/021; B60K 2026/023; B60K 2026/025; G05G 1/38; G05G 1/44
See application file for complete search history.

(56) References Cited

U.S. PATENT DOCUMENTS

| | | | | |
|---|---|---|---|---|
| 2,836,990 A * | 6/1958 | De Heer | ............... | B60K 26/021 74/478.5 |
| 3,623,693 A * | 11/1971 | Hill | ....................... | B60K 26/021 123/343 |
| 4,510,906 A * | 4/1985 | Klatt | ..................... | B60K 26/021 123/396 |
| 6,023,995 A | 2/2000 | Riggle | | |
| 9,108,510 B2 * | 8/2015 | Sieber | ................... | B60K 26/021 |
| 9,176,516 B2 * | 11/2015 | Gauthier | ................ | B60L 11/123 |

(Continued)

FOREIGN PATENT DOCUMENTS

| | | |
|---|---|---|
| CN | 101804792 A | 8/2010 |
| CN | 201553032 U | 8/2010 |

(Continued)

OTHER PUBLICATIONS

EP1078310 (A4), Vehicle Accelerator Pedal Apparatus With Position-Adjustment Feature, Nov. 16, 2005. Abstract and Search Report.

*Primary Examiner* — Adam D Rogers
(74) *Attorney, Agent, or Firm* — Kirton McConkie; Evan R. Witt

(57) ABSTRACT

An accelerator pedal information feedback system is provided for allowing the driver of the large electric vehicle to realize the status of the power system in real time. The information feedback system uses the power system information of the vehicle to calculate the systematic loading status information and feeds the information back to the driver. Consequently, the driver can realize the loading status of the power system in real time.

11 Claims, 5 Drawing Sheets

(56) References Cited

U.S. PATENT DOCUMENTS

| | | | | |
|---|---|---|---|---|
| 9,464,578 B2* | 10/2016 | Shiomi | ............... | B60K 26/021 |
| 9,529,367 B2* | 12/2016 | Sieber | .................. | B60W 50/16 |
| 2009/0173587 A1 | 7/2009 | Campbell | | |
| 2016/0159216 A1* | 6/2016 | Konigorski | .......... | B60K 26/021 |
| | | | | 74/513 |

FOREIGN PATENT DOCUMENTS

| | | |
|---|---|---|
| CN | 201908730 U | 7/2011 |
| CN | 202213497 U | 5/2012 |
| CN | 202338589 U | 7/2012 |
| DE | 29612273 | 12/1996 |
| JP | S58114925 U | 8/1983 |
| JP | H0192537 A | 4/1989 |
| JP | H10166890 A | 6/1998 |
| JP | H10230784 A | 9/1998 |
| JP | 2007261399 A | 10/2007 |
| JP | 2011005929 A | 1/2011 |
| JP | 2012001027 A | 1/2012 |
| JP | 2013014259 A | 1/2013 |
| JP | 2013244842 A | 12/2013 |
| TW | 382357 U | 2/2000 |
| WO | 9959046 A1 | 5/1999 |
| WO | 2013087273 A1 | 6/2013 |

\* cited by examiner

ACCELERATOR PEDAL INFORMATION FEEDBACK SYSTEM

FIELD OF THE INVENTION

The present invention relates to an accelerator pedal information feedback system for providing the loading status information of a power system to a driver, and more particularly to an accelerator pedal information feedback system using sensors to collect systematic operating information, using a computer program to calculate the loading status of a power system of the vehicle, adjusting the damping force of an accelerator pedal according to the loading status information and providing the loading status information to the driver. The accelerator pedal information feedback system is applied to a large electric vehicle.

BACKGROUND OF THE INVENTION

In comparison with the vehicles using internal combustion engines, electric vehicles have many benefits such as low noise and low vibration. Generally, while driving the vehicle with the internal combustion engine, the driver can realize the loading condition of the engine and judge whether the operation of the vehicle is normal according to the vibration and noise generated by the engine. Due to the low noise and the low vibration of the electric vehicle, the driver cannot realize the operating condition of the electric vehicle according to the generated vibration and noise. Consequently, the possibility of causing breakdown of the electric vehicle in the overloading or overheating condition will be increased. Although the vehicle body is equipped with instruments, the driver may ignore the messages on the instruments if the traffic condition is crowded or the driving time period is very long.

SUMMARY OF THE INVENTION

As previously described, the vehicle using the internal combustion engine may generate vibration and noise during operation of the vehicle. The features of the vibration and the noise are correlated with the loading status of the power system. Consequently, the driver can realize the loading status of the power system of the vehicle by sensing vibration and noise of the vehicle. In case that the vehicle using the internal combustion engine is replaced by the electric vehicle, the driver cannot realize the loading status of the power system because the vibration and noise generated by the power system of the electric vehicle are largely reduced. If the power system is operated in the heavy loading condition for a long time, the overheating and overloading problems possibly occur. Although the current-limiting protection mechanism is enabled according to the loading status, the command inputted by the driver cannot match the real output power of the vehicle. Under this circumstance, the driver feels tired and distrusts the vehicle. If an emergency situation occurs and large power output is required, the power is limited and an accident possibly happens.

Conventionally, if the large electric vehicle is in the heavy loading status for a long time, the power system of the large electric vehicle has an overheating problem. The present invention provides an improved systematic loading status feedback system for effectively transmitting the systematic loading information to the driver. Consequently, the overheating problem of the large electric vehicle in the heavy loading status will be overcome.

The present invention has the following objects. A first object is to provide a systematic loading status feedback system without adversely affecting the driver's attention to the surroundings. A second object is to provide a mechanism for feeding a systematic loading status back to the driver in real time. A third object is to provide a systematic loading status feedback system with enhanced safety. A fourth object is to provide a high safety systematic protection mechanism for avoiding the overloading problem that is caused from improper operation.

In accordance with an aspect of the present invention, there is provided an accelerator pedal information feedback system. The accelerator pedal information feedback system includes a base plate, a movable pedal, a pedal angle sensor, a fixed elastic element, an adjustable elastic element, a systematic loading status sensor and a control unit. The base plate is coupled with a vehicle structure to provide a firm mounting base. The movable pedal is disposed on the base plate. The pedal angle sensor is used for sensing a displacement of the pedal. The fixed elastic element is used for providing a fixed damping force to the pedal. The control unit is used for controlling the adjustable elastic element to provide a variable damping force to the pedal according to an information provided by the systematic loading status sensor.

In an embodiment, the fixed elastic element is a spring.

In an embodiment, the fixed elastic element is a rubbery elastomer.

In an embodiment, the fixed elastic element is an electromagnetic actuator.

In an embodiment, the adjustable elastic element is a spring, and the variable damping force is correspondingly changed when a preloading force applied to the spring is changed.

In an embodiment, the adjustable elastic element is a pneumatic spring, and the variable damping force is correspondingly changed when a gas pressure of the pneumatic spring is changed.

In an embodiment, the adjustable elastic element is an electromagnetic actuator.

In accordance with another aspect of the present invention, there is provided an accelerator pedal information feedback system. The accelerator pedal information feedback system includes a base plate and a movable pedal. The base plate is coupled with a vehicle structure to provide a firm mounting base. The movable pedal is disposed on the base plate, and selectively moved in a first moving range or a second moving range. A fixed damping force is provided to the pedal when the pedal is in the first moving range. A variable damping force is provided to the pedal when the pedal is in the second moving range. The variable damping force is correlated with loading information of a power system of a vehicle.

In accordance with a further aspect of the present invention, there is provided an accelerator pedal information feedback system of a large electric vehicle. The accelerator pedal information feedback system includes an accelerator pedal, a first elastic element, a control unit, a second elastic element and a preloading adjustment mechanism. The first elastic element provides a fixed damping force to the accelerator pedal. The control unit is used for receiving a temperature information of a power system and calculating a systematic loading coefficient according to a mathematic formula containing the temperature information of the power system. The preloading adjustment mechanism is used for generating a variable damping force to the accelerator pedal according to the systematic loading coefficient.

A driver of the electric vehicle realizes a real-time loading condition of the power system according to a change of the variable damping force.

In an embodiment, the control unit further receives a temperature information of a motor controller, and the mathematic formula for calculating the systematic loading coefficient further contains the temperature information of the motor controller.

In an embodiment, the control unit further receives an inner temperature information of a motor, and the mathematic formula for calculating the systematic loading coefficient further contains the inner temperature information of the motor.

In an embodiment, the control unit further receives a temperature information of a battery, and the mathematic formula for calculating the systematic loading coefficient further contains the temperature information of the battery.

In an embodiment, the control unit further receives a residual battery capacity information, and the mathematic formula for calculating the systematic loading coefficient further contains the residual battery capacity information.

In an embodiment, the control unit further receives a cumulative driving time information, and the mathematic formula for calculating the systematic loading coefficient further contains the cumulative driving time information.

In an embodiment, the control unit further receives a vehicle weight information, and the mathematic formula for calculating the systematic loading coefficient further contains the vehicle weight information.

The above contents of the present invention will become more readily apparent to those ordinarily skilled in the art after reviewing the following detailed description and accompanying drawings, in which:

DETAILED DESCRIPTION OF THE PREFERRED EMBODIMENT

Figure 1:
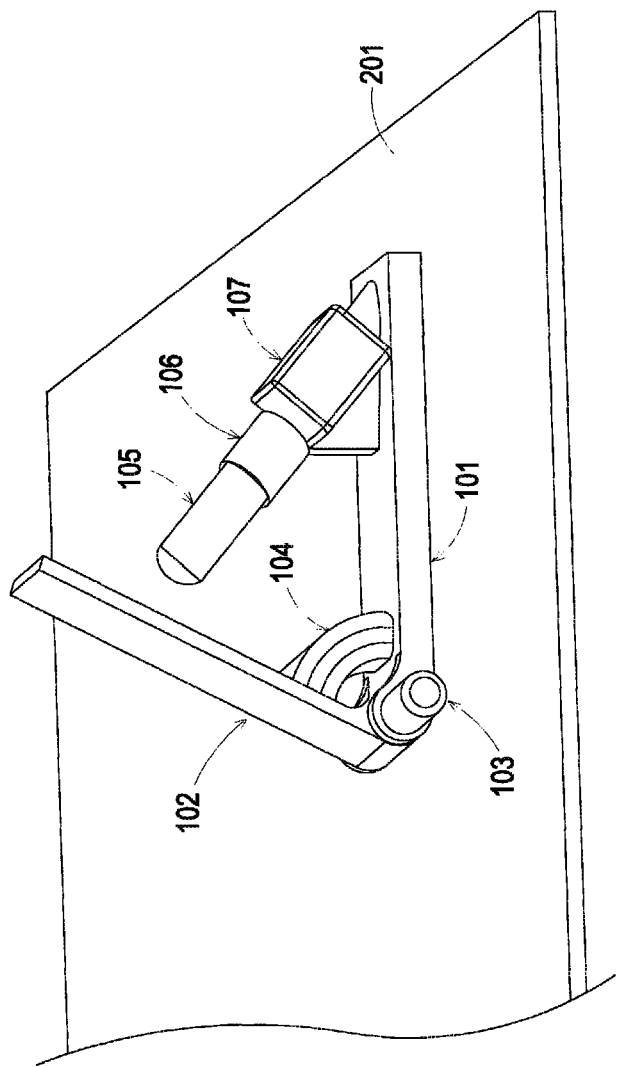
FIG. 1 schematically illustrates an accelerator pedal information feedback system according to a first embodiment of the present invention.

The present invention provides a systematic loading status feedback system in order to effectively solve the following drawbacks.

Firstly, if the driver wants to realize the systematic loading status, the driver has to pay attention to the instruments, and thus the driver is unable to pay attention to the surroundings while looking at the instruments. Conventionally, the power system messages are shown on the instruments that are installed on the driving console. For reading the systematic loading status, the driver has to divert the line of vision from the road surface to the driving console. Under this circumstance, the driver may not pay attention to the road condition temporarily. If an emergency situation occurs during this time period, the processing timing is delayed and an accident possibly happens.

Secondly, the driver cannot intuitively realize the systematic loading status, and thus the driver has to take time and pay attention to interpret the obtained messages. Conventionally, the power system information is shown in a digital form or a pointer form. After the messages are received, the driver needs mental ability to interpret the received messages. Furthermore, since the driver has to divert the line of vision between the road surface and the driving console, the eyes' fatigue of the driver may influence the concentration.

Thirdly, if the systematic loading status warning function has a breakdown, the driver's ability to manipulate and concentrate the vehicle is adversely affected. Conventionally, the overloading warning message of the power system is indicated by a light of flash or a warning sound to prompt the driver that the vehicle is overloaded. If the sensor has a malfunction to result in erroneous judgment, the sustained flash light or warning sound may influence the concentration and mood of the driver and may panic the passengers.

Fourthly, if the system is in the overloading state, the driver is unable to manipulate the vehicle because of the current-limiting protection mechanism, and thus the vehicle is at the risk. Conventionally, the overloading protection mechanism of the power system is determined by the control system according to the limitation of the output current, and the overloading protection mechanism is used to reduce the output power of the vehicle in order to avoid the overloading condition of the power system. If the driver needs motive power to avoid the accident while the overloading protection mechanism is enabled, the driver may not precisely manipulate the vehicle. Under this circumstance, the accident possibly happens.

For effectively solving the above drawbacks, the present invention provides an accelerator pedal information feedback system. In an embodiment of the present invention, the accelerator pedal information feedback system includes a damping force-adjustable accelerator pedal mechanism, plural systematic status sensors and a control unit. The damping force-adjustable accelerator pedal mechanism comprises a pedal base plate, a pedal body, a pedal angle sensor, a fixed elastic element, an adjustable elastic element and a preloading adjustment mechanism.

The plural systematic status sensors are used for sensing the loading status information of the power system and providing the information to the control unit. For example, the systematic loading status information includes a motor temperature information, a motor driver temperature information, a battery temperature information, a cooling system temperature information and a battery charge status information. The control unit determines the damping force of the pedal according to the information provided by the systematic status sensors, and controls the accelerator pedal mechanism to perform a corresponding adjusting operation. Moreover, the control unit calculates a systematic loading coefficient according to a mathematic formula containing the received temperature information of the power system.

Figure 2:
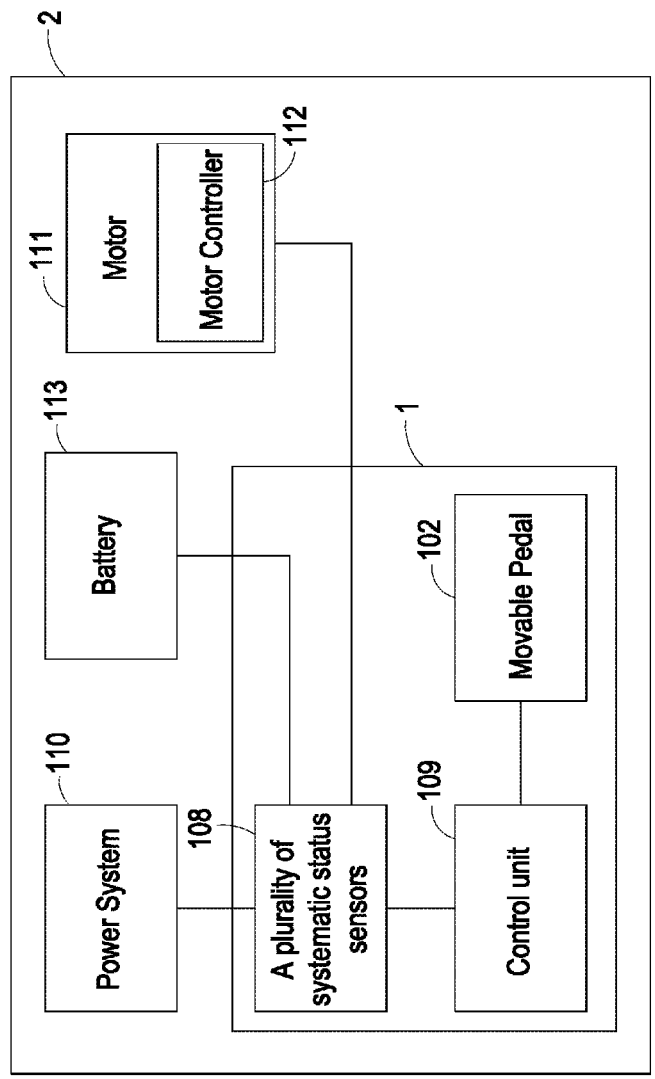
FIG. 2 is a block diagram of the accelerator pedal information feedback system and the relationship of the vehicle, the accelerator pedal information feedback system and the elements thereof.
Figure 3A:
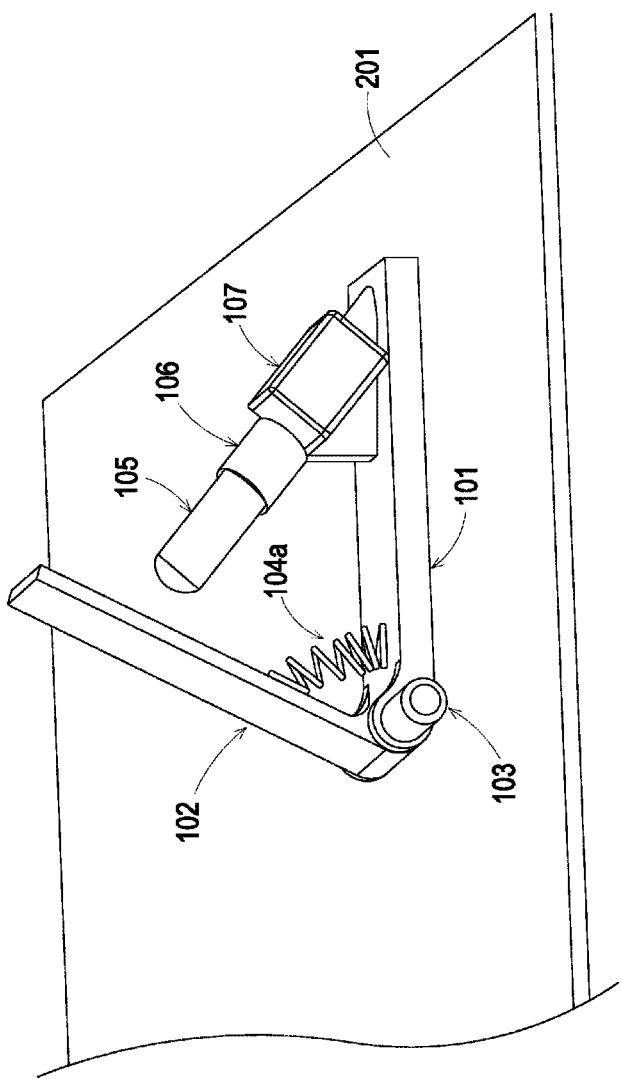
FIG. 3A schematically illustrates an accelerator pedal information feedback system according to a second embodiment of the present invention.
Figure 3B:
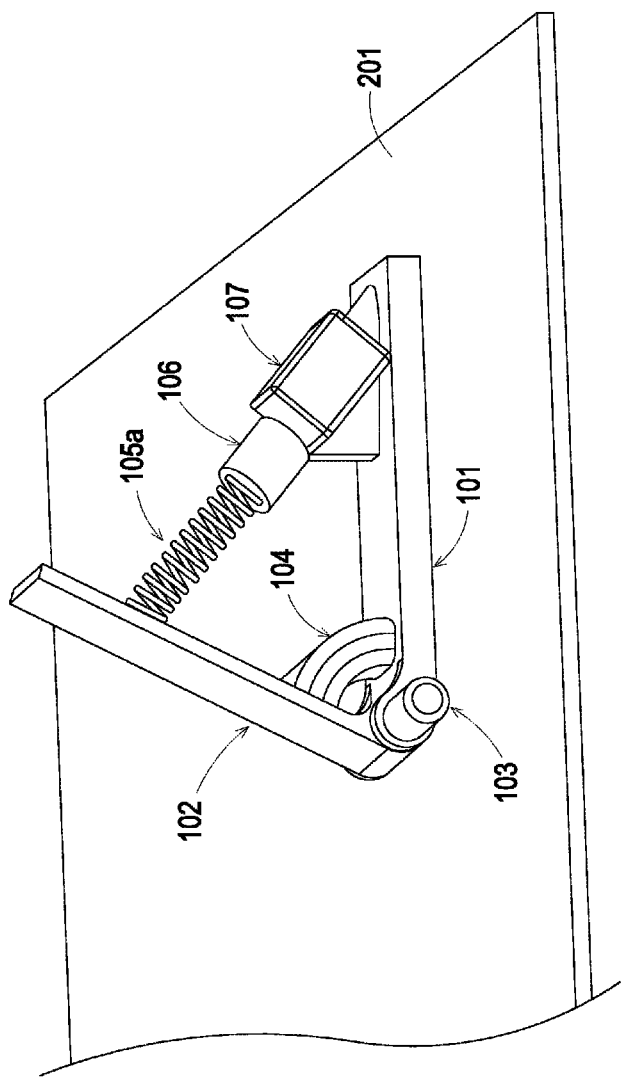
FIG. 3B schematically illustrates an accelerator pedal information feedback system according to a third embodiment of the present invention.
Figure 4:
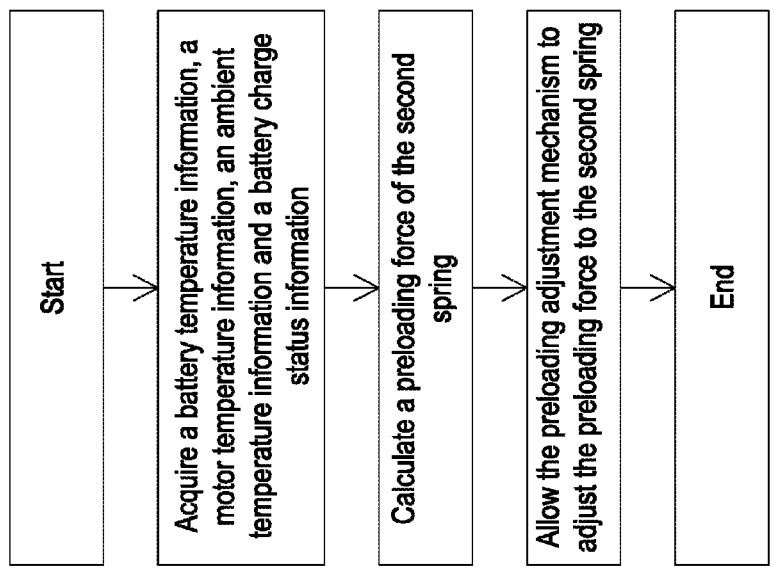
FIG. 4 is a flowchart illustrating a control method for the accelerator pedal information feedback system of the present invention.

Please refer to FIGS. 1, 2, 3A, 3B and 4. FIG. 1 schematically illustrates an accelerator pedal information feedback system according to a first embodiment of the present invention. FIG. 2 is a block diagram of the accelerator pedal information feedback system and the relationship of the vehicle, the accelerator pedal information feedback system and the elements thereof. FIG. 3A schematically illustrates an accelerator pedal information feedback system according to a second embodiment of the present invention. FIG. 3B schematically illustrates an accelerator pedal information feedback system according to a third embodiment of the present invention FIG. 4 is a flowchart illustrating a control method for the accelerator pedal information feedback system of the present invention. A base plate 101 is coupled to a vehicle structure 201 so as to provide a mounting base. A pedal 102 is pivotally coupled to the base plate 101, and rotatable relative to a rotation shaft. An angle sensor 103 is connected with the pedal 102 and the base plate 101 for sensing an angle between the pedal 102 and the base plate 101. Moreover, the angle sensor 103 is used to provide a displacement of the pedal 102 to the power system.

A fixed elastic element 104 (or a first elastic element) is used for providing a stable damping force to the pedal 102. In the first embodiment, the fixed elastic element is an elastomer 104. Another example of the fixed elastic element 104 includes but is not limited to a spring 104a (as shown in FIG. 3A), or an electromagnetic actuator.

As shown in FIG. 3A, an adjustable elastic element 1050 (or a second elastic element) is separated from the pedal 102 by a specified distance. As shown in FIG. 3B, another example of the adjustable elastic element 105 includes but is no limited to a second spring 105a. If the displacement of the pedal 102 is smaller than the specified distance and in a first moving range, the pedal 102 is not in contact with the second spring 105a. Meanwhile, only the elastomer 104 provides the damping force to the pedal 102. If the displacement of the pedal 102 is larger than the specified distance and in a second moving range, the pedal 102 is in contact with the second spring 105a. Meanwhile, both of the elastomer 104 and the second spring 105a provide the damping force to the pedal 102. The second spring 105a (as shown in FIG. 3B) is an example of an adjustable elastic element 105. Another example of the adjustable elastic element 105 includes but is not limited to a spring, a pneumatic spring or an electromagnetic actuator.

A pre-compressor 106 is used for providing a preloading force to the second spring 105a. In response to the preloading force, the damping force provided to the pedal 102 by the second spring 105a is increased. When a preloading adjustment mechanism 107 receives a command from a control unit 109, the preloading adjustment mechanism 107 adjusts the preloading force of the pre-compressor 106. Consequently, the damping force provided from the second spring 105a to the pedal 102 is correspondingly adjusted. In case that the second elastic element 105 is a pneumatic spring, the preloading adjustment mechanism 107 controls the pre-compressor 106 to change a gas pressure of the pneumatic spring. Consequently, the damping force of the pneumatic spring applied to the pedal 102 is correspondingly changed.

Please refer to FIGS. 1, 2 and 4. The present invention further provides a control method. When the vehicle 2 is started, the following steps are performed to control the preloading adjustment mechanism 107.

In a step 1, the system enters a self-checking state to confirm whether all sensors are normally operated.

In a step 2, plural systematic status sensors 108 provide systematic loading status information to the control unit 109. The systematic loading status information includes a motor temperature information, a motor driver temperature information, a battery temperature information, a cooling system temperature information and a battery charge status information. Moreover, the mathematic formula for calculating the systematic loading coefficient may further contain a temperature information of a motor controller 112, an inner temperature information of a motor 111 and a temperature information of a battery 113.

In a step 3, the control unit 109 calculates a damping force of the pedal according to the systematic loading status information, and calculates a corresponding preloading force according to a parameter of the second spring 105a.

In a step 4, the preloading force is converted into a control command, and the control command is transmitted to the preloading adjustment mechanism 107. Consequently, the preloading adjustment mechanism 107 controls the pre-compressor 106 to adjust the preloading force to the second spring 105a.

In a step 5, the control method is ended after the preloading force to the second spring 105a is adjusted, and a next startup procedure is waited. Moreover, the mathematic formula for calculating the systematic loading coefficient may further contain a residual battery capacity information, a cumulative driving time information and a vehicle weight information.

The accelerator pedal information feedback system land the control method of the present invention can overcome the overloading problem of the power system 110. In addition, the control unit 109 can enhance the driving safety or the energy utilization efficiency by using other vehicle-related information. For example, the vehicle-related information includes the vehicle weight information, the section speed limit, the cumulative driving time information, the distance from the front car and the battery charge status information.

The accelerator pedal information feedback system and the control method of the present invention can overcome the overloading problem of the power system. In addition, the control unit can enhance the driving safety or the energy utilization efficiency by using other vehicle-related information. For example, the vehicle-related information includes the vehicle weight information, the section speed limit, the cumulative driving time information, the distance from the front car and the battery charge status information.

The concepts of the present invention can solve the drawbacks of the conventional technologies and achieve the following advantages.

Firstly, during the driving period, the driver can realize the systematic loading status according to the damping force of the accelerator pedal. Consequently, the driver does not need to divert the line of vision from the road surface to the driving console and the vehicle is not at risk.

Secondly, the driver can intuitively realize the systematic loading status according to the damping force of the accelerator pedal without the need of interpreting the data or the pointer position. When compared with the data or the pointer position to be interpreted, the damping force of the accelerator pedal sensed by the leg's muscles can transmits the systematic loading status information to the driver more immediately.

Thirdly, if the system has a breakdown, only the damping force of the second spring applied to the pedal is influenced. That is, the driver's ability to manipulate the vehicle is not adversely affected, and the flash of light or the warning sound that easily influence driver is not generated.

Fourthly, in case that the power system is in the heavy loading status, the information feedback system of the present invention only increases the damping force of the second spring that is applied to the pedal and does not limit the output of the power system. If the driver wants to large increase the output power of the vehicle while avoiding the accident, the driver only needs to provide a large downward force to stamp on the pedal. Consequently, the power system can still provide the output power according to the displacement of the pedal.

What is claimed is:

1. An accelerator pedal information feedback system, comprising:
    a base plate coupled with a vehicle structure to provide a mounting base;
    a movable pedal disposed on the base plate;
    a pedal angle sensor for sensing a displacement of the pedal;
    a fixed elastic element for providing a fixed damping force to the pedal;
    an adjustable elastic element;
    a plurality of systematic status sensors; and
    a control unit for controlling the adjustable elastic element to provide a variable damping force to the pedal according to an information provided by the plurality of systematic status sensors.

2. The accelerator pedal information feedback system of claim 1, wherein the fixed elastic element is a spring.

3. The accelerator pedal information feedback system of claim 1, wherein the fixed elastic element is an elastomer.

4. The accelerator pedal information feedback system of claim 1, wherein the adjustable elastic element is a spring.

5. The accelerator pedal information feedback system of claim 4, wherein the variable damping force is correspondingly changed when a preloading force applied to the spring is changed.

6. An accelerator pedal information feedback system of a electric vehicle, the accelerator pedal information feedback system comprising:
    an accelerator pedal;
    a first elastic element for providing a fixed damping force to the accelerator pedal;
    a control unit for receiving a temperature information of a power system and calculating a systematic loading coefficient according to a mathematic formula containing the temperature information of the power system;
    a second elastic element; and
    a preloading adjustment mechanism for generating a variable damping force to the accelerator pedal according to the systematic loading coefficient, wherein a driver of the electric vehicle realizes a real-time loading condition of the power system according to a change of the variable damping force,
    wherein the control unit further receives a temperature information of a battery, and a mathematic formula for calculating the systematic loading coefficient further contains the temperature information of the battery.

7. The accelerator pedal information feedback system of claim 6, wherein the control unit further receives a temperature information of a motor controller, and a mathematic formula for calculating the systematic loading coefficient further contains the temperature information of the motor controller.

8. The accelerator pedal information feedback system of claim 7, wherein the control unit further receives an inner temperature information of a motor, and a mathematic formula for calculating the systematic loading coefficient further contains the inner temperature information of the motor.

9. The accelerator pedal information feedback system of claim 6, wherein the control unit further receives a residual battery capacity information, and a mathematic formula for calculating the systematic loading coefficient further contains the residual battery capacity information.

10. The accelerator pedal information feedback system of claim 6, wherein the control unit further receives a cumulative driving time information, and a mathematic formula for calculating the systematic loading coefficient further contains the cumulative driving time information.

11. The accelerator pedal information feedback system of claim 6, wherein the control unit further receives a vehicle weight information, and a mathematic formula for calculating the systematic loading coefficient further contains the vehicle weight information.

* * * * *